Patented June 3, 1952

2,599,516

UNITED STATES PATENT OFFICE 2,599,516

O-2,4,5-TRICHLOROPHENYL O,O-DIALKYL-THIOPHOSPHATES

Clarence L. Moyle, Clare, Mich., assignor to The Dow Chemical Company, Midland, Mich., a corporation of Delaware No Drawing. Application March 30, 1950, Serial No. 152,976

3 Claims. (Cl. 260—461)

This invention is directed to the O-2,4,5-trichlorophenyl O,O-dialkylthiophosphates having the formula

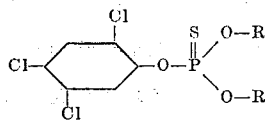

wherein R represents a methyl or ethyl radical. These new compounds are oily liquids, somewhat soluble in many organic solvents, and substantially insoluble in water. They are of value as toxic constituents of insecticide compositions.

The new compounds may be prepared by reacting O-(2,4,5-trichlorophenyl) dichlorothiophosphate of the formula

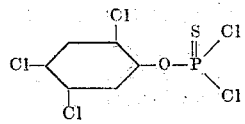

with an alkali metal methylate or an alkali metal ethylate. The reaction is carried out in an inert organic solvent and conveniently in the alcohol employed in the preparation of the alcoholate. Good results are obtained when employing two molecular proportions of the alcoholate with each molecular proportion of O-(2,4,5-trichlorophenyl) dichlorothiophosphate. In practice, the alcoholate employed is preferably the sodium salt and may be prepared by reacting the desired alcohol with sodium in an inert organic solvent and conveniently in an excess of the corresponding alcohol. The reaction between the alcoholate and O-(2,4,5-trichlorophenyl) dichlorothiophosphate may be accomplished by adding either reactant portionwise to the other dispersed in the reaction solvent.

The above operations are carried out with agitation and at a temperature of from 10° to 85° C. The reaction is somewhat exothermic, and temperature control is maintained by regulation of the rate of addition of the reactants, as well as by the addition and subtraction of heat, if required.

Upon completion of the reaction, the solvent is removed from the crude mixture by evaporation and the residue dispersed in a nonreactive organic solvent such as methylene dichloride, carbon tetrachloride, or diethyl ether. The resultant mixture may be successively washed with dilute aqueous sodium hydroxide and water, and dried with anhydrous sodium sulfate. The separation of the product is then accomplished by evaporation of the solvent. If desired, the product may be further purified by fractional distillation under reduced pressure.

The O-(2,4,5-trichlorophenyl) dichlorothiophosphate employed as a starting material may be prepared by reacting a molecular excess of thiophosphoryl chloride (PSCl3) with an alkali metal 2,4,5-trichlorophenate. Good results are obtained when employing from 2 to 4 moles of thiophosphoryl chloride per mole of 2,4,5-trichlorophenate. The phenate, preferably as the sodium salt, is added portionwise with stirring to the thiophosphoryl chloride and the mixture subsequently warmed for a short time to complete the reaction. The crude reaction mixture is then filtered and the filtrate fractionally distilled under reduced pressure to separate the product.

EXAMPLE 1

O-2,4,5-trichlorophenyl O,O-dimethyl-thiophosphate

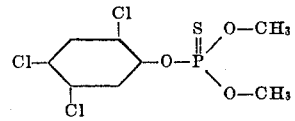

3.43 grams (0.15 mole) of sodium was dissolved in 59.7 grams (1.86 mole) of methanol to prepare an alcoholic solution of the corresponding alcoholate. This solution was added portionwise over a period of 5 minutes with stirring to 23.1 grams (0.07 mole) of O-(2,4,5-trichlorophenyl)-dichlorothiophosphate (having a density of 1.65 at 25° C. and a refractive index $n_D$ of 1.6054 at 35° C.) dissolved in 25 milliliters of methanol. The temperature rose to 40° C. during the addition, and the mixture was subsequently maintained at the same temperature for 10 minutes to complete the reaction. The methanol was then removed by evaporation, and the residue dispersed in 100 milliliters of diethyl ether. The resulting dispersion was successively washed with dilute sodium hydroxide and water, and dried with anhydrous sodium sulfate. The diethyl ether was then removed by evaporation to obtain O-2,4,5-trichlorophenyl O,O-dimethylthiophosphate as a colorless oil. The latter product was fractionally distilled under reduced pressure to obtain substantially pure O-2,4,5-trichlorophenyl O,O-dimethylthiophosphate having a boiling point of 152°–154° C., a density of 1.46 at 28° C., and a refractive index $n_D$ of 1.5597 at 35° C.

EXAMPLE 2

*O-2,4,5-trichlorophenyl O,O-diethyl-thiophosphate*

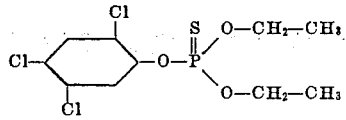

3.43 grams (0.15 mole) of sodium was dissolved in 59 grams (1.28 mole) of ethanol and the resulting solution added portionwise over a period of 5 minutes with stirring to 23.1 grams (0.07 mole) of O-2,4,5-trichlorophenyl dichlorothiophosphate dissolved in 25 milliliters of ethanol. During the addition the temperature of the reaction mixture rose to 40° C., and the mixture was subsequently maintained at this same temperature for 10 minutes to complete the reaction. The ethanol was then removed from the crude reaction mixture by evaporation, and the residue dispersed in 100 milliliters of diethyl ether. The resulting mixture was successively washed with dilute aqueous sodium hydroxide and water, and dried with anhydrous sodium sulfate. The diethyl ether was then removed by evaporation to obtain O-2,4,5-trichlorophenyl O,O-diethylthiophosphate as a pale yellow oil having a density of 1.32 at 23° C. and a refractive index $n_D$ of 1.5388 at 35° C.

The new thiophosphates have been found effective as insecticides and are adapted to be employed for the control of a wide range of agricultural and household pests. For such use the products may be dispersed on a finely divided solid and employed as dusts. Also, such mixtures may be dispersed in water with the aid of a wetting agent and the resulting aqueous suspensions employed as sprays. In other procedures, the products may be employed in oils, as constituents of oil in water emulsions, or in water dispersions with or without the addition of dispersing or emulsifying agents.

The products of the preceding examples have been tested for the control of two-spotted spider mite, bean aphid, Mexican bean beetle, and Southern army worm. In representative operations against such organisms, 100 per cent kills have been obtained with aqueous spray compositions containing 0.12 to 2 pounds of the toxicant per 100 gallons of spray mixture.

I claim:

1. An O-2,4,5-trichlorophenyl O,O-dialkylthiophosphate having the formula

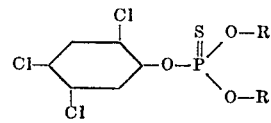

wherein R represents a member of the group consisting of the methyl and ethyl radicals.

2. O-2,4,5-trichlorophenyl O,O-dimethylthiophosphate.

3. O-2,4,5-trichlorophenyl O,O-diethylthiophosphate.

CLARENCE L. MOYLE.

REFERENCES CITED

The following references are of record in the file of this patent:

UNITED STATES PATENTS

| Number | Name | Date |
| --- | --- | --- |
| 2,508,335 | Moyle et al. | May 16, 1950 |
| 2,520,393 | Fletcher | Aug. 29, 1950 |

FOREIGN PATENTS

| Number | Country | Date |
| --- | --- | --- |
| 326,137 | Great Britain | Feb. 28, 1930 |
| 333,561 | Great Britain | Aug. 11, 1930 |